United States Patent [19]
Nagano

[11] Patent Number: 5,497,680
[45] Date of Patent: Mar. 12, 1996

[54] APPARATUS FOR SECURING A SHOE TO A BICYCLE PEDAL

[75] Inventor: Masashi Nagano, Izumi, Japan

[73] Assignee: Shimano Inc., Osaka, Japan

[21] Appl. No.: 334,851

[22] Filed: Oct. 25, 1994

Related U.S. Application Data

[63] Continuation of Ser. No. 180,809, Jan. 10, 1994, abandoned, which is a continuation of Ser. No. 74,151, Jun. 9, 1993, abandoned, which is a continuation of Ser. No. 726,284, Jul. 5, 1991, abandoned.

[30] Foreign Application Priority Data

Jul. 9, 1990 [JP] Japan ..................................... 2-182322

[51] Int. Cl.⁶ ....................................................... G05G 1/14
[52] U.S. Cl. ........................... 74/594.6; 74/594.4; 36/131
[58] Field of Search ............................... 74/594.4, 594.6; 36/131, 132; D12/125

[56] References Cited

U.S. PATENT DOCUMENTS

| | | | |
|---|---|---|---|
| 4,928,549 | 5/1990 | Nagano | 36/131 X |
| 4,947,708 | 8/1990 | Lacombe | 74/594.4 X |
| 5,014,571 | 5/1991 | Dapezi | 74/594.6 |
| 5,048,369 | 9/1991 | Chen | 74/594.6 |

FOREIGN PATENT DOCUMENTS

| | | | |
|---|---|---|---|
| 0058438 | 8/1982 | European Pat. Off. | 74/594.6 |
| 146454 | 6/1985 | European Pat. Off. | 74/594.6 |
| 359134 | 3/1990 | European Pat. Off. | 74/594.6 |
| 2620409 | 3/1989 | France | 74/594.6 |

*Primary Examiner*—Vinh T. Luong
*Attorney, Agent, or Firm*—Dickstein, Shapiro & Morin

[57] ABSTRACT

A bicycle pedal including a front engaging device and a rear engaging device arranged with a cleat bearing surface therebetween in a fore and aft direction of the pedal for engaging the cleat. The rear engaging device is pivotable about a pivotal axis extending parallel to a pedal shaft, and is urged by an urging element in a direction to engage the cleat. The rear engaging device includes a first split part for engaging the cleat, and a second split part attached to the pedal for supporting the first split part. The first split part is movable with the cleat in an engaged position, relative to the second split part within a predetermined range in a direction traversing the fore and aft direction of the pedal. The first split part includes a contact surface for pressing the cleat from above, and a plurality of engaging surfaces spaced from each other along the pedal shaft for pressing the cleat in a pivoting direction around the pivotal axis, i.e. in the fore and aft direction of the pedal.

When the cleat is turned on the pedal surface about a point adjacent a front engaging point in the direction traversing the fore and aft direction of the pedal, a restoring force acts on the cleat to return the cleat to an original position. The restoring force is produced by a relationship between one of the engaging surfaces of the first split part pressing the cleat and a center of pivotal movement of the first split part.

14 Claims, 5 Drawing Sheets

APPARATUS FOR SECURING A SHOE TO A BICYCLE PEDAL

This application is a continuation of application Ser. No. 08/180,809, filed on Jan. 10, 1994, now abandoned, which is a continuation of application Ser. No. 08/074,151, filed on Jun. 9, 1993, now abandoned, which is a continuation of application Ser. No. 07/726,284, filed on Jul. 5, 1991, now abandoned.

BACKGROUND OF THE INVENTION

1. Field of the Invention

The present invention relates to an apparatus for securing a cleat attached to a shoe to a bicycle pedal, and more particularly to an apparatus including a front engaging device and a rear engaging device arranged with a cleat bearing surface therebetween in a fore and aft direction of the pedal for engaging the cleat.

2. Description of the Related Art

A known bicycle pedal having an apparatus as noted above is disclosed in European Patent Publication EP-0,353,169, for example. This pedal comprises a pedal body divided into a front part attached to a crank shaft or pedal shaft, and a rear part connected to the front part, to be pivotable on a pedal plane. The front part includes a front engaging device fixed thereto, while the rear part includes a rear engaging device pivotable in a fore and aft direction of the pedal which is perpendicular to the pedal shaft. The rear engaging device is urged by a spring in a direction to engage the cleat. Since the rear part is pivotable with the rear engaging device relative to the front part about a point adjacent the front engaging device, the cyclist, can turn his or her foot right or left on the pedal surface together with the cleat and the rear part of the pedal.

In the above construction, however, the pivotable rear part of the pedal forms part of the pedal tread, and is therefore subjected to a strong treading force during a run. The strong treading force produces a great frictional resistance in a slide portion between the front part and rear part during their relative pivotal movement, and this resistance hampers the pivotal movement. To reduce the frictional resistance in the slide portion requires a large and complicated construction resulting in a high manufacturing cost.

Furthermore, once the rear part has made a pivotal movement, no restoring action takes place to return the rear part to an original position. Such a restoring force is applied solely by the cyclist intentionally twisting his or her foot. The great frictional force is problematic in this case too.

SUMMARY OF THE INVENTION

An object of the present invention is to provide an improvement upon the known apparatus for securing a shoe to a bicycle pedal which, despite a strong treading force applied, does not produce a great frictional force when the cleat is moved on a pedal surface in a direction traversing the fore and aft direction of the pedal.

Another object of the invention is to provide a construction which produces a restoring force to return a cleat to an original position after the cleat is moved from the original position.

The above objects are fulfilled, according to the present invention, by an apparatus for securing a cleat attached to a shoe to a bicycle pedal, comprising a first engaging device and a second engaging device formed on the pedal with a spacing therebetween in a fore and aft direction of the pedal for engaging the cleat, the second engaging device including a first split part for engaging the cleat, and a second split part attached to the pedal for supporting the first split part, the first split part being movable with the cleat in an engaged position, relative to the second split part within a predetermined range in a direction traversing the fore and aft direction of the pedal.

In the above construction, the first split part is movable with the cleat in an engaged position, relative to the second split part in a direction traversing the fore and aft direction of the pedal. The cleat therefore remains rigidly engaged during such movement. Further, since a slide portion is formed between the first and second split parts constituting one of the engaging devices, the cyclist can move his or her foot sideways as secured to the pedal, free of a great frictional force, while treading the pedal with a strong force. This allows the cyclist to take an efficient pedaling action with the shoes maintained in an optimal position relative to the pedals to meet the cyclist's own taste as well as ground conditions. In addition, by forming the slide portion between the first and second split parts to which no great treading force is applied, the slide structure is simplified to realize economical manufacture of pedals.

In a preferred embodiment of the present invention, the second engaging device is pivotable on a pivotal axis extending parallel to the pedal shaft, to move into and out of engagement with the cleat, and is urged by an urging device in a direction to engage the cleat. Further, the first split part includes a contact surface for pressing the cleat from above and a plurality of engaging surfaces spaced from each other along the pedal shaft for pressing the cleat in a pivoting direction around the pivotal axis, i.e. in the fore and aft direction of the pedal. With this construction, when the cleat is turned on the pedal surface about a point adjacent a front engaging point in the direction traversing the fore and aft direction of the pedal, a restoring force acts on the cleat to return the cleat to an original position. The restoring force is produced by the pressing force acting on the cleat in the fore and aft direction of the pedal, based on a relationship between one of the engaging surfaces of the first split part still pressing the cleat and a center of pivotal movement of the first split part. This gives comfort to the cyclist in sideways reciprocating his or her foot. The urging device mentioned above for engaging the cleat may be used as a restoring mechanism also, which renders the construction simple and low cost.

In a further preferred embodiment of the invention, a switch mechanism is provided which is selectively switchable between a position to allow movement, of the first split part relative to the second split, part, and a position to prohibit such movement. With this construction, selection may be made without changing pedals as to whether or not the shoe in the engaged position should be allowed to move sideways relative to the pedal during a run. That is, this construction enables a selection to be made in relation to a single pedal whether or not to allow the sideways movement of the shoe in an engaged position. Consequently, the cyclist can pedal the bicycle after selecting an optimal condition of cleat engagement for a run according to his or her taste.

Other features and advantages of the present invention will be apparent from the description of the preferred embodiments to be read with reference to the drawings.

DETAILED DESCRIPTION OF THE PREFERRED EMBODIMENTS

An embodiment of the present invention will be described hereinafter with reference to the drawings.

Figure 1:
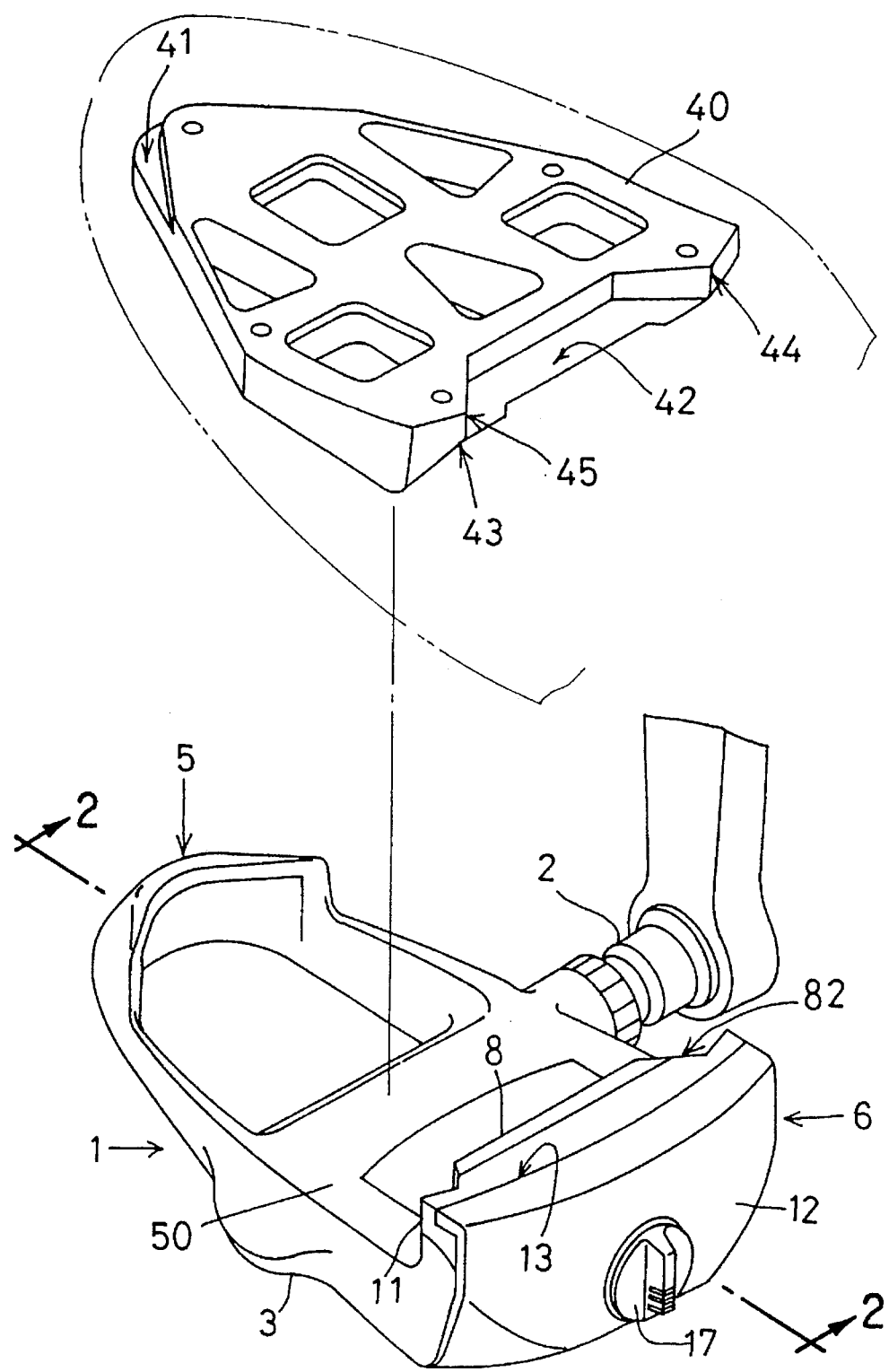
FIG. 1 is a perspective view showing a relationship between a bicycle pedal and a cleat according to the present invention.
Figure 2:
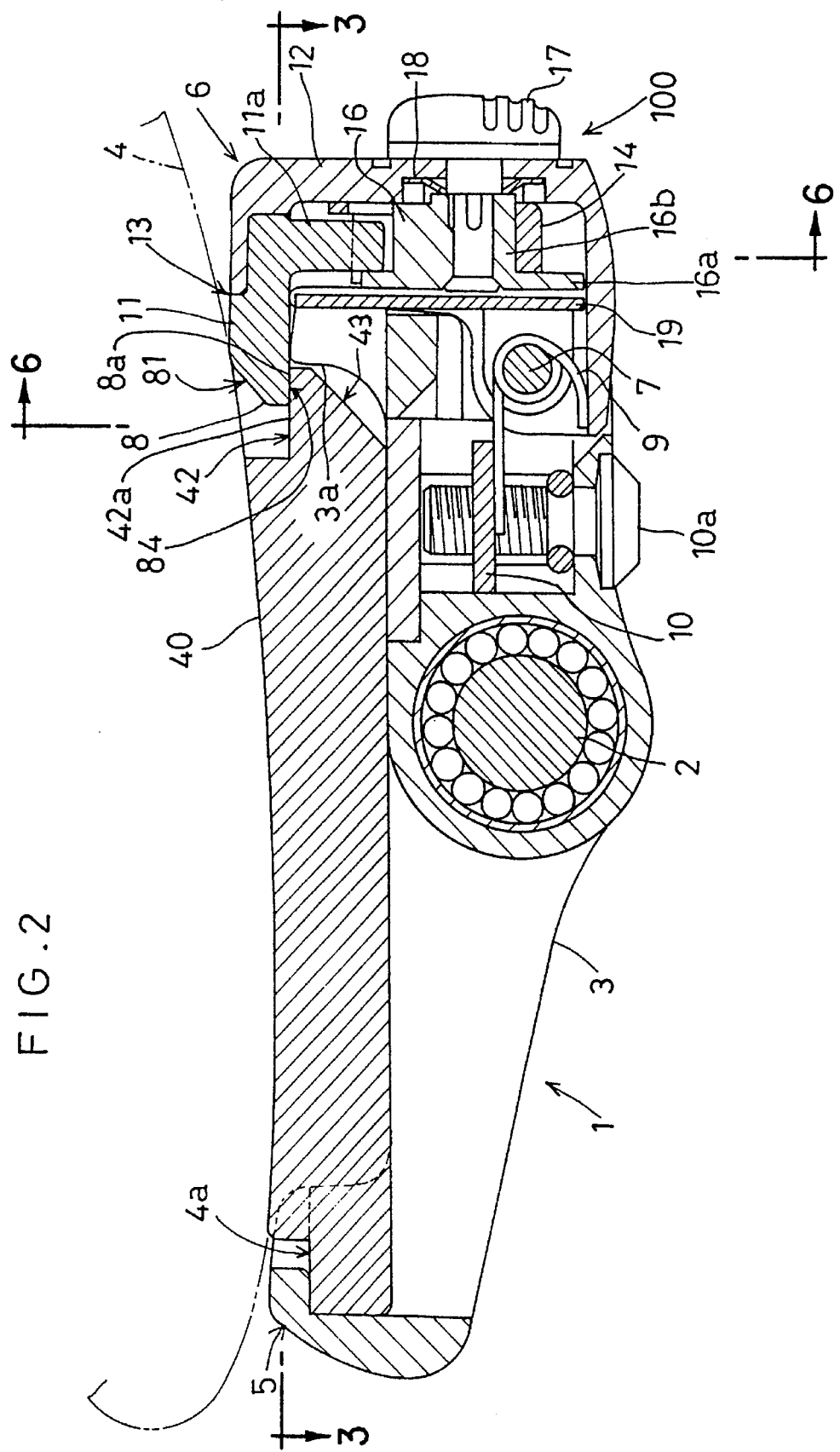
FIG. 2 is a view in vertical section along the line 2—2 of FIG. 1

As shown in FIGS. 1 and 2, a bicycle pedal 1 essentially comprises a pedal body 3 pivotably supported on a pedal shaft 2 extending horizontally from a crank shaft. The pedal body 3 defines a pedal tread surface or cleat bearing surface 50 extending parallel to the pedal shaft 2 for supporting a cleat 40 secured to a bicycle shoe 4. The pedal body 3 includes a front engaging device 5 which acts as a first engaging means and a rear engaging device 6 which acts as a second engaging means for engaging the cleat 40, These engaging devices 5 and 6 are disposed in a front region and a rear region of the pedal body 3 with respect to a direction perpendicular to the pedal shaft 2, i,e, with respect to the fore and aft direction of the pedal, In this embodiment, the front engaging device 5 is formed integral with the pedal body 3, The rear engaging device 6 is connected at a lower end thereof to the pedal body 3 to be pivotable in the fore and aft direction of the pedal, through a horizontal shaft 7 extending parallel to the pedal shaft 2. An engaging jaw 8 for contacting and engaging the cleat 40 is urged counterclockwise in FIG. 2 by a torsion coil spring 9 to a cleat engaging position. For this purpose, one leg of the torsion coil spring 9 is in contact with a lower position of the rear engaging device 6 while the other leg thereof is in contact with an adjusting plate 10 mounted inwardly of the pedal body 3. The adjusting plate 10 is vertically movable, in a screw feed mode, by an interaction between a female screw defined centrally thereof and an adjusting screw 10a meshed with the female screw. The movement of the adjusting plate 10, which is caused by turning the adjusting screw 10a at a lower end thereof, varies the urging force of the torsion coil spring 9. The above structure that allows rear engaging device 6 to pivot acts as a pivoting means.

Figure 3:
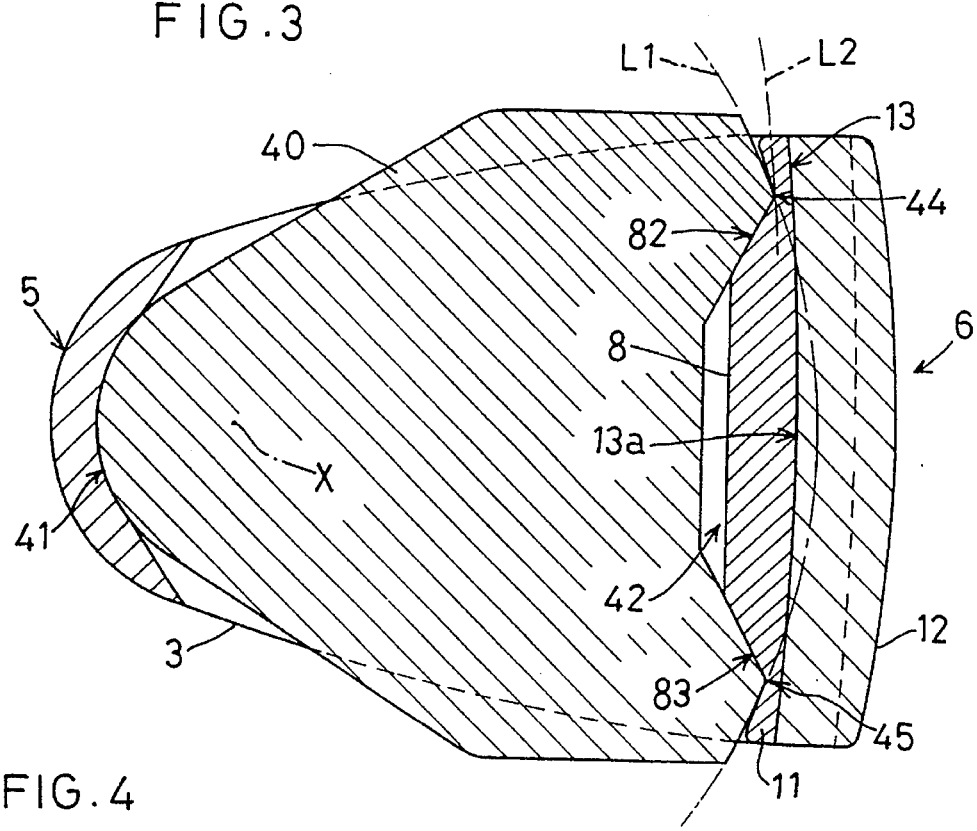
FIG. 3 is a cross-sectional view along the line the line 3—3 of FIG. 2, showing a relationship between an engaging device and the cleat in an original position.

The relationship between the rear engaging device 6 and cleat 40 will be described now. As also shown in FIG. 3, the cleat, 40 includes front and rear coupling portions 41 and 42 engageable with the two engaging devices 5 and 6. As seen from FIG. 2, the rear coupling portion 42 includes a sloping surface 43, and a contact surface 42a. On the other hand, the engaging jaw 8 defines a sloping surface 81 on an upper forward end thereof, which contacts the sloping surface 43 and causes the rear engaging device 6 to pivot clockwise or rearwardly when the cleat 40 is moved into engagement. According to this construction, the rear coupling portion 42 of the cleat 40 is engaged by the rear engaging device 6 when the cleat 40 is depressed against the tread surface 50 of the pedal 1 with the front coupling portion 41 placed in engagement with the front engaging device 5. The engaging jaw 8 also has a contact surface 8a for pressing the cleat contact surface 42a from above. The engaging jaw 8 has releasing cam or engaging surfaces 82 and 83 defined on opposite, right and left sides of a fore and aft centerline of the pedal 1, the cam surfaces 82 and 83 having a gentle inclination and extending toward each other forwardly of the pedal 1. The cleat 40 also defines rear release portions 44 and 45 extending substantially along and contacting the release cam surfaces 82 and 83, respectively, when the cleat, 40 is connected to the pedal 1.

Figure 4:
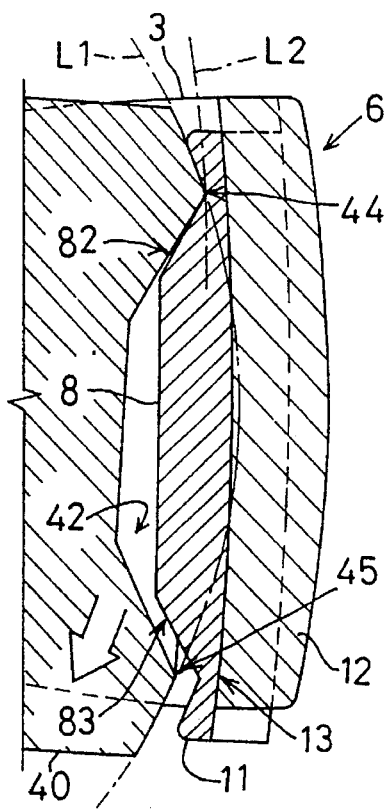
FIG. 4 is a section view corresponding to FIG. 3 but showing only a portion of the cleat in movement within a predetermined range.
Figure 5:
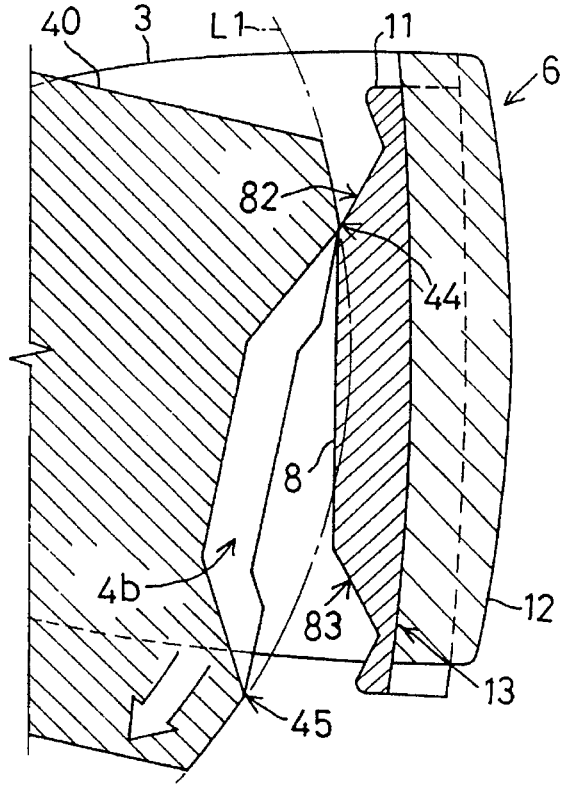
FIG. 5 is a section view of the portion of the cleat further turned from the position shown in FIG. 4.

When the cleat 40 is engaged with the rear engaging device 6 (FIGS. 2 and 3), the rear connecting portion 42 of the cleat 40 is pressed from above by a contact surface 84 of the engaging jaw 8, and the release portions 44 and 45 of the cleat 40 are opposed in the fore and aft direction to the engaging surfaces 82 and 83 of the engaging jaw 8, respectively. Thus, when the cleat 40 in the engaged position is turned on the cleat bearing surface 50 about a first virtual axis X adjacent the front engaging device 5, the release portion 44 or 45 pushes the release cam surface 82 or 83. This causes the rear engaging device 6 to pivot to a large extent rearwardly, whereby the cleat 40 becomes disengaged from the pedal 1. Since the release portions 44 and 45 and the release cam surfaces 82 and 83 opposed thereto are distributed to opposite sides of the centerline extending in the fore and aft direction of the pedal and through the first virtual axis X, the release portion 44 and release cam surface 82 contact each other when the cleat 40 is turned counterclockwise, and the release portion 45 and release cam surface 83 contact each other when the cleat 40 is turned clockwise. FIGS. 3 through 5 show such movement of the cleat 40 and function of the rear engaging device 6, which will be described in greater detail later. Reference 3a in FIG. 2 denotes a projection for stopping rearward movement of the cleat 40, thereby to prevent the cleat 40 from becoming disengaged.

As best seen from FIG. 2, the rear engaging device 6 has a two-part construction including a first split part 11 having the engaging jaw 8 and a second split part 12 attached to the pedal 1. The first split part 11 is movable, together with the cleat 40 in the engaged position, relative to the second split part 12 within a predetermined range transversely of the pedal 1.

Figure 6:
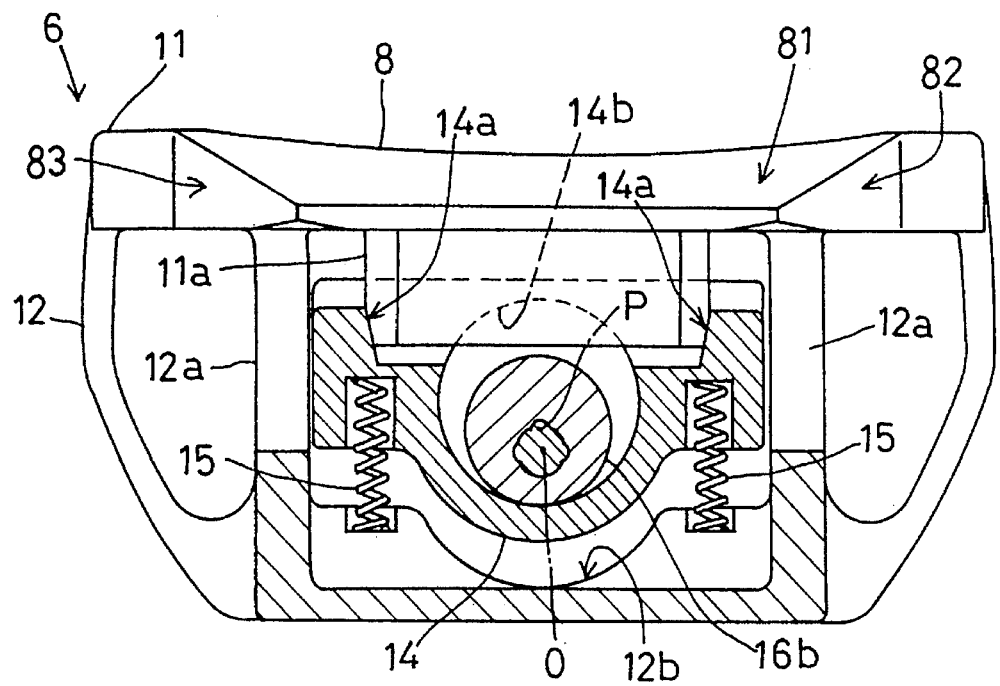
FIG. 6 is a cross-sectional view taken along the line 6—6 of FIG. 2, showing a rear engaging device and a switch mechanism.
Figure 7:
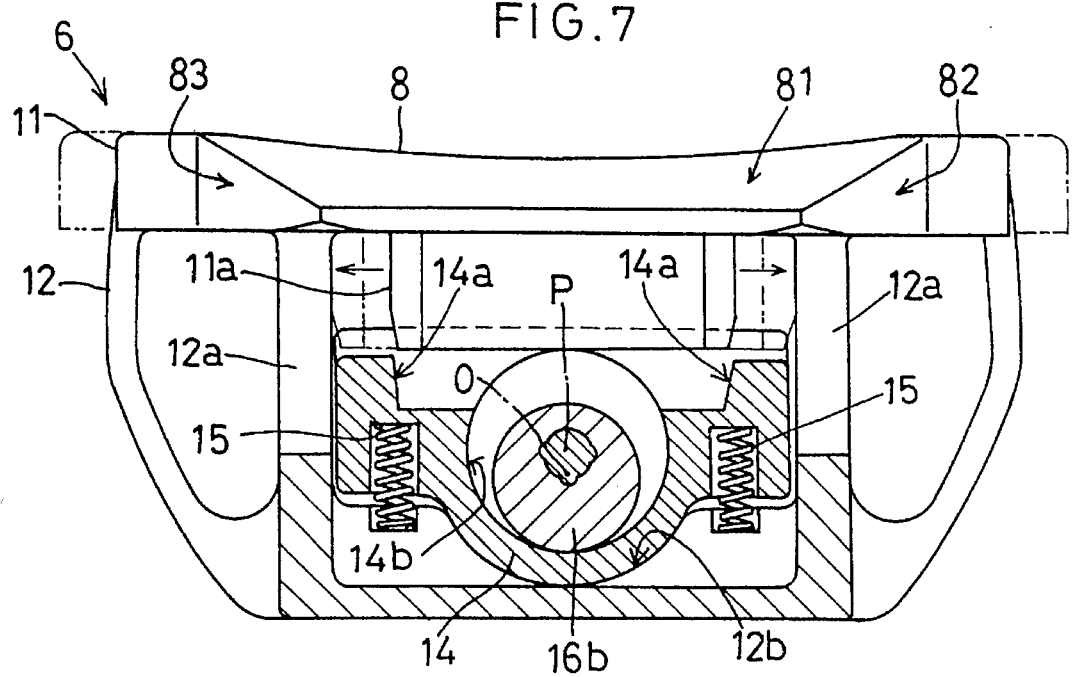
FIG. 7 is a rear section view corresponding to FIG. 6 and showing the switch mechanism in a movement permitting position.

The first split part 11 includes a movement restricting projection 11a formed in a lower portion thereof and projecting inwardly of the second split part 12. As shown in FIGS. 6 and 7, the transverse movement of the first split part 11 relative to the second split part 12 is limited to the predetermined range by contact of the movement restricting projection 11a with lateral wails 12a of the second split part 12. Thus, the cleat 40 is releasable (FIG. 5) when the rear engaging device 6 pivots to a great extent rearwardly only after the movement restricting projection 11a contacts one of the lateral wails 12a of the second split part 12. The above structure that allows first split part 11 to move relative to second split part 12 within a predetermined range acts as a movement means.

The first and second split parts 11 and 12 define a slide portion 13 therebetween which lies in an arcuate plane around a second virtual axis (not shown) located forwardly of the front engaging device 5. Consequently, when the first split part 11 moves, with the cleat 40 in the engaged position, transversely relative to the second split part 12, the rear engaging device 6 pivots in a direction to release the cleat 40, that is clockwise in FIG. 2.

Figure 8:
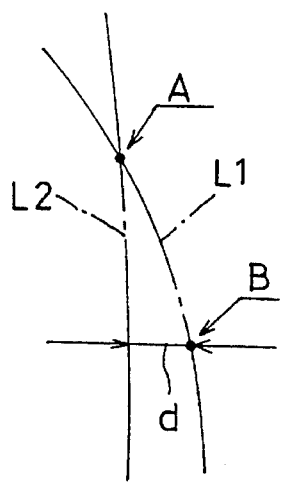
FIG. 8 is an explanatory view illustrating a relationship between a locus of the cleat and a locus of a first split part.

In FIGS. 3 through 5, reference L1 denotes a locus of movement described by a point of contact of the release portion 44 of the cleat 40 with the release cam surface 82 when the cleat 40 is turned clockwise about the first virtual axis X, and reference L2 denotes a locus of movement described by a point of contact of the release cam surface 82 with the release portion 44 when the first split part 11 pivots clockwise about the first virtual axis X and moves along the slide portion 13 as guided by the second split part 12. These two loci are shown in FIG. 8. Reference A denotes a point of contact on the locus L1 with the release cam surface 82 of the release portion 44 lying in the position shown in FIG. 3. Reference B denotes a point of contact on the locus L1 of the release cam surface 82 of the release portion 44 in the position shown in FIG. 4. As seen from FIG. 8, the locus L1 of movement of the release portion 44 of the cleat 40 is located a distance d rearwardly of the locus L2 of movement of the engaging jaw 8. However, these loci must coincide since the cleat. 40 and the first split, part 11 actually move together. Consequently, the rear engaging device 6 pivots a maximum of distance d rearwardly with the movement of the cleat 40 and first, split, part, 11. At this time, the entire rear engaging device 6 receives a forwardly acting force from the torsion coil spring 9. This forward force is applied also to the cleat 40 through the release cam surface 82 and release portion 44. Since this contact portion is offset with respect to the first virtual axis X, a restoring force acts on the turned cleat 40 to move the cleat 40 with the first split part 11 back to the original position. Similarly, when the cleat 40 is turned counterclockwise in FIG. 3, a restoring force acts on the turned cleat 40 to move the cleat 40 with the first split part 11 back to the original position since the contact between the release cam surface 83 and release portion 45 are offset with respect to the first virtual axis X.

The sideways movement of the first split part 11 serves the purpose of allowing movement of the cleat 40 to reduce a load acting on a knee or the like of the cyclist. It is necessary to maintain the engagement of the cleat 40 with the pedal. Thus, the slide portion 13 has such a curvature that the amount of backward movement, of the rear engaging device 6 resulting from the sideways movement of the first split part 11 does not go beyond the limit of engagement of the contact surface 81 of the first split part 11 with the coupling portion 42 of the cleat 40. This prevents the cleat 40 from inadvertently becoming disengaged.

The movement of the first split part 11 relative to the second split part 12 is allowed or prohibited by a switch mechanism 100. As shown in FIGS. 6 and 7, the switch mechanism 100 includes, as a main component thereof, a movement restrictor or stopper 14 vertically slidably mounted in the second split part 12. The movement restrictor 14 defines a pair of restricting surfaces 14a and a center recess 14b therebetween. This restrictor 14 is constantly urged upward by a pair of compression coil springs 15. The recess 14b accommodates a switch member 16 extending therethrough. The switch member 16 includes a first cylindrical portion 16a in slidable contact with an arcuate surface 12b formed on the second split, part 12 (FIG. 2), and a second cylindrical portion 16b lying in the recess 14b. A switch control element, 17 is connected to the switch member 16 and rotatably supported in a rear position of the second split part, 12.

Figure 9:
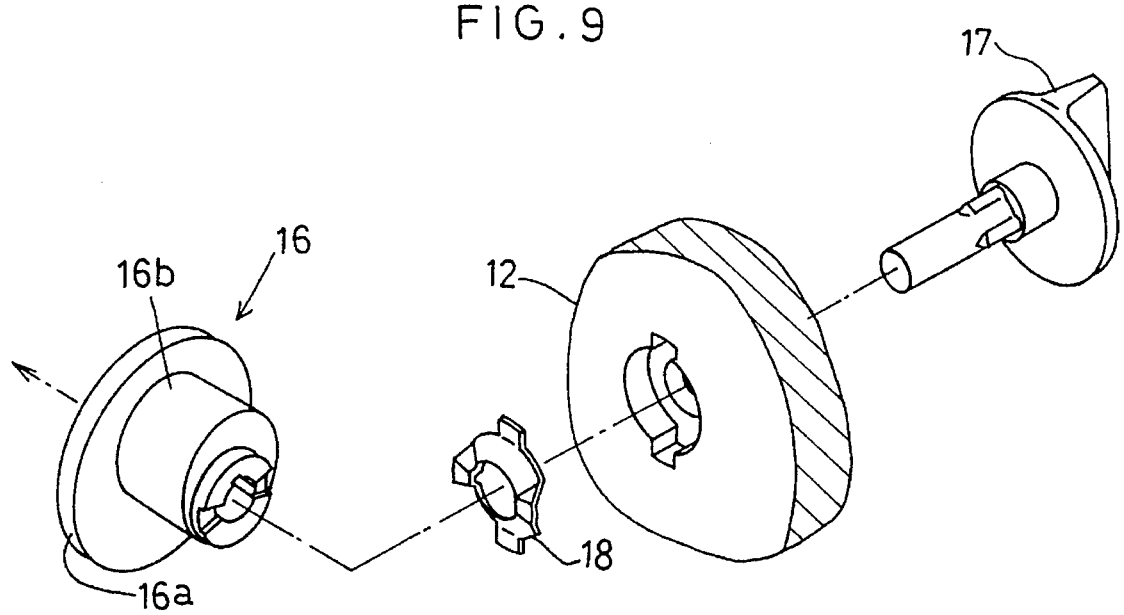
FIG. 9 is an exploded perspective view of position maintaining mechanism of a switching element.

The restricting surfaces 14a are inclined t,o diverge upwardly, and restrict the first split part 11 against movement, relative to the second split part 12 when the restricting surfaces 14a, under the urging force of the compression coil springs 15, contact opposite sides of the movement restricting projection 11a of the first split part 11. The second cylindrical port, ion 16b has an axis P offset from an axis O of the first, cylindrical portion 16a. The stopper 14 may be lowered against the urging force of the compression coil springs 15 by turning the switch member 16 to place the axis P below the axis O. As a result, the restricting surfaces 14a move out of engagement with the movement restricting projection 11a. As shown in FIG. 9, the switch member 16 defines two recesses on a rear face thereof, and a spring element 18 having projections for fitting into these recesses is mounted in a rear inside wall of the second split part 12 not, to be rotatable relative thereto. Thus, the switch member 16 is movable between and retainable in a position to allow movement of the first split part 11 relative to the second split part 12, and a position to prohibit such movement. Reference numeral 19 in FIG. 2 denotes a lid for contacting the first split part 11, movement restrictor 14 and switch member 16 to contain these components in the second split part 12.

An operation of the bicycle pedal 1 having the foregoing construction will be described next.

For allowing the cleat 40 engaged by the two engaging devices 5 and 6 to move sideways, the switch control element 17 is operated to lower the movement restrictor 14 as shown in FIG. 7. When a weak sideways force acts on the cleat 40 during pedaling of the bicycle, for example, the first split part 11 is movable sideways relative to the second split part 12 as shown in FIG. 4 to allow the cleat 40 to turn around the first virtual axis X. At this time, the cleat 40 receives the restoring force to return to the original position, which is due to the urging force of the torsion coil spring 9 resulting from the slight backward movement of the rear engaging device 6. When, for example, the bicycle turns over and a strong sideways force acts on the cleat 40, the movement restricting projection 11a of the first split part 11 contacts one inside lateral wall 12a of the second split part, 12, to lock the two split parts 11 and 12 against relative movement. Then, as shown in FIG. 5, the release portion 44 of the cleat 40 presses against the release cam surface 82 of the engaging jaw 8, whereby the rear engaging device 6 moves to a great extent, backward to release the cleat 40 from the pedal 1.

To lock the cleat, 40 against sideways movement, the switch control element 17 may be operated to raise the movement restrictor 14 to move the restricting surfaces 14a into contact with the movement restricting projection 11a as shown in FIG. 6. When, in this state, the bicycle turns over and a strong sideways force acts on the cleat 40, the cleat 40 becomes disengaged from the pedal 1 by the same function as when the two split parts 11 and 12 are locked against relative movement as described above.

Other embodiments of the present invention are listed hereunder.

(1) Although only the rear engaging device 6 is pivotable in the foregoing embodiment, only the front engaging device 5 may be pivotable or both engaging devices 5 and 6 may be constructed pivotable.

(2) In the foregoing embodiment, the rear engaging device 6 has a two-part construction to allow sideways movement of the cleat 40. The front engaging device 5, nay also have a similar two-part construction.

(3) In the foregoing embodiment, the rear engaging device 6 is pivotable forward to engage the cleat 40. Alternatively, the rear engaging device 6 may be pivotable backward for engaging the cleat 40.

(4) In the foregoing embodiment, the slide portion 13 between the first split part 11 and second split part 12 has an arcuate shape. However, this is not limitative and the slide portion 13 may define a flat transverse plane or may have a non-planar shape.

What is claimed is:

1. An apparatus including a bicycle pedal, a pedal shaft for supporting said bicycle pedal, and means for securing a shoe cleat to said bicycle pedal, the apparatus comprising:

first engaging means and second engaging means formed on said pedal with a spacing therebetween in a fore and aft direction of said pedal for engaging said cleat, said second engaging means including a first split part for engaging said cleat, and a second split part attached to said pedal for supporting said first split part, pivoting means for allowing said second split part together with said first split part to pivot about an axis between engaging and disengaging positions for engaging and disengaging said cleat, respectively, and movement means for allowing said first split part to move transversely relative to said second split part in a sideways direction and for allowing said first split part to move together with said cleat within a predetermined range in said sideways direction.

2. The apparatus of claim 1, further comprising urging means for urging said second engaging means toward said engaging position to engage said cleat.

3. The apparatus of claim 2, wherein said first split part includes a contact surface for pressing said cleat from above, and a plurality of engaging surfaces spaced from each other along said pedal shaft for pressing said cleat in a pivoting direction around said axis.

4. The apparatus of claim 3, wherein said first split part and said second split part define a slide surface therebetween whose shape is determined to cause said first split part to be displaced also in the fore and aft direction of said pedal against the urging force of said urging means when said first split part moves relative to said second split part with turning of said cleat on a surface of said pedal.

5. The apparatus of claim 1, further comprising a stopper for preventing said first split part from moving relative to said second split part.

6. The apparatus of claim 5, further comprising switch means for selectively switching said stopper between an operative position and an inoperative position.

7. The apparatus of claim 1, wherein said first engaging means is disposed in a forward region of said pedal, and said second engaging means is disposed in a rearward region of said pedal.

8. An apparatus including a bicycle pedal, a pedal shaft for supporting said bicycle pedal, and means for securing a shoe cleat to said bicycle pedal, the apparatus comprising:

first engaging means and second engaging means formed on said pedal with a spacing therebetween in a fore and aft direction of said pedal for engaging said cleat, a cleat bearing surface disposed between said first engaging means and said second engaging means for supporting said cleat, said second engaging means including a first split part for engaging said cleat, and a second split part attached to said pedal for supporting said first split part, pivoting means for allowing said second split part together with said first split part to pivot about an axis between engaging and disengaging positions for engaging and disengaging said cleat, respectively, and movement means for allowing said first split part to move transversely relative to said second split part in a sideways direction and for allowing said first split part to move together with said cleat within a predetermined range in said sideways direction.

9. An apparatus including a bicycle pedal, a pedal shaft for supporting said bicycle pedal, a cleat including a front coupling portion, a rear connecting portion, engaging surfaces, and means for connecting said cleat to a shoe, and means for securing said cleat to said bicycle pedal, the apparatus comprising:

first and second engaging means for engaging said front coupling portion and said rear connecting portion, respectively, said first and second engaging means being formed on said pedal with a spacing therebetween in a fore and aft direction of said pedal, said second engaging means including a first split part for engaging said rear connecting portion of said cleat, and a second split part attached to said pedal for supporting said first split part, pivoting means for allowing said second split part to pivot together with said first split part about an axis between engaging and disengaging positions for engaging and disengaging said rear connecting portion, respectively, movement means for allowing said first split part to move transversely relative to said second split part in a sideways direction and for allowing said first split part to move together with said cleat within a predetermined range in said sideways direction.

10. The apparatus of claim 9, wherein said cleat further includes a sloping surface (43) for moving said second engaging means toward said disengaging position.

11. The apparatus of claim 10, wherein said cleat further includes a contact surface, and wherein said first split part includes a surface for pressing said contact surface of said cleat from above, said contact surface of said cleat being located between said engaging surfaces (82, 83), and said contact surface of said cleat being located above said sloping surface (43).

12. The apparatus of claim 9, further comprising a stopper for preventing said first split part from moving relative to said second split part, and switch means for selectively switching said stopper between an operative position and an inoperative position.

13. An apparatus including a bicycle pedal, a pedal shaft for supporting said bicycle pedal, and means for securing a shoe cleat to said bicycle pedal, the apparatus comprising:

first engaging means and second engaging means formed on said pedal with a spacing therebetween in a fore and aft direction of said pedal for engaging said cleat, said second engaging means including a first split part for engaging said cleat, and a second split part attached to said pedal for supporting said first split part, pivoting means for allowing said second split part to pivot about an axis between engaging and disengaging positions for engaging and disengaging said cleat, respectively, movement means for allowing said first split part to move transversely relative to said second split part in a sideways direction and for allowing said first split part to move together with said cleat within a predetermined range in said sideways direction, a stopper for preventing said first split part from moving relative to said second split part, and switch means for selectively switching said stopper between an operative position and an inoperative position.

14. An apparatus including a bicycle pedal, a pedal shaft for supporting said bicycle pedal, a cleat including a front coupling portion, a rear connecting portion, engaging surfaces and means for connecting said cleat to a shoe, and means for securing said cleat to said bicycle pedal, the apparatus comprising:

first and second engaging means for engaging said front coupling portion and said rear connecting portion, respectively, said first and second engaging means being formed on said pedal with a spacing therebetween in a fore and aft direction of said pedal, said second engaging means including a first split part for engaging said rear connecting portion of said cleat, and a second split part attached to said pedal for supporting said first split part, pivoting means for allowing said second split part to pivot about an axis between engaging and disengaging positions for engaging and disengaging said rear connecting portion, respectively, movement means for allowing said first split part to move relative to said second split part in a sideways direction and for allowing said first split part to move together with said cleat within a predetermined range in said sideways direction, a stopper for preventing said first split part from moving relative to said second split part, and switch means for selectively switching said stopper between an operative position and an inoperative position.

* * * * *